United States Patent
Inamura (10) Patent No.: US 7,190,410 B2
(45) Date of Patent: Mar. 13, 2007

(54) COLOR TEMPERATURE CORRECTION CIRCUIT

(75) Inventor: Kohei Inamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 478 days.

(21) Appl. No.: 10/887,829

(22) Filed: Jul. 12, 2004

(65) Prior Publication Data

US 2005/0012867 A1 Jan. 20, 2005

(30) Foreign Application Priority Data

Jul. 15, 2003 (JP) ............................. 2003-274992
Jun. 15, 2004 (JP) ............................. 2004-176701

(51) Int. Cl.
*H04N 9/73* (2006.01)

(52) U.S. Cl. ...................... 348/656; 348/655

(58) Field of Classification Search ............... 348/655, 348/656, 649, 223.1; 345/589, 690; 358/516; 382/167

See application file for complete search history.

(56) References Cited

U.S. PATENT DOCUMENTS

| | | | | |
|---|---|---|---|---|
| 4,694,330 A | * | 9/1987 | Tanaka et al. ............... 348/656 |
| 5,315,378 A | * | 5/1994 | Satou et al. ................. 348/655 |
| 5,371,615 A | * | 12/1994 | Eschbach ..................... 358/515 |
| 5,644,367 A | * | 7/1997 | Yu | |
| 5,721,628 A | * | 2/1998 | Takaragi et al. ............. 358/518 |
| 5,850,472 A | * | 12/1998 | Alston et al. ................ 382/162 |
| 6,064,494 A | * | 5/2000 | Hirota et al. ................. 358/1.9 |
| 6,633,407 B1 | * | 10/2003 | Kim et al. ..................... 358/1.9 |
| 6,809,714 B1 | * | 10/2004 | Yamauchi et al. ............. 345/88 |
| 6,901,162 B2 | * | 5/2005 | Kagawa et al. ............. 382/162 |
| 7,024,034 B2 | * | 4/2006 | Kim et al. ................... 382/162 |
| 2004/0109604 A1 | | 6/2004 | Kayawa et al. ............. 382/167 |

FOREIGN PATENT DOCUMENTS

| | | |
|---|---|---|
| JP | 63-160492 | 7/1988 |
| JP | 5-48897 | 2/1993 |
| WO | WO 03/034710 A1 | 4/2003 |

* cited by examiner

*Primary Examiner*—Victor R. Kostak
(74) *Attorney, Agent, or Firm*—Fitzpatrick, Cella, Harper & Scinto (57) ABSTRACT

Denoting a maximum value of three primary color signals RGB by Max, a minimum value by Min, and coefficients by a and b, the color temperature of only colors close to achromatic colors is changed by adding (a*Min−b*Max) to the signal B. Denoting a luminance level by Y, and coefficients by c and d, the color temperature of only colors close to achromatic colors is changed by adding (c*Y−d*(Max−Min)) to the signal B. Color temperature of only colors close to achromatic colors is changed by multiplying the signal B by a coefficient based on a value of (Man−Min)/Max, which represents saturation.

12 Claims, 7 Drawing Sheets

COLOR TEMPERATURE CORRECTION CIRCUIT

This application claims priorities from Japanese Patent Applications No. 2003-274992 filed Jul. 15, 2003 and No. 2004-176701 filed Jun. 15, 2004, which are hereby incorporated by reference.

BACKGROUND OF THE INVENTION

1. Field of the Invention

The present invention relates to a color temperature correction circuit used in an image display apparatus such as a color television receiver.

2. Description of the Related Art

In conventional color television receivers, the color temperature is set to a rather high value in order to suit the color reproduction of the white color to the viewer's taste. However, there is a problem that the reproduction of a color other than the white color becomes poor if the color temperature is set to a high value. Accordingly, various methods of correcting the color temperature only in white color parts and preventing colored parts from being corrected have been considered.

An example of the methods is described in Japanese Patent Application Laid-Open (JP-A) No. 63-160492. This example will now be described with reference to FIG. 6.

Figure 6:
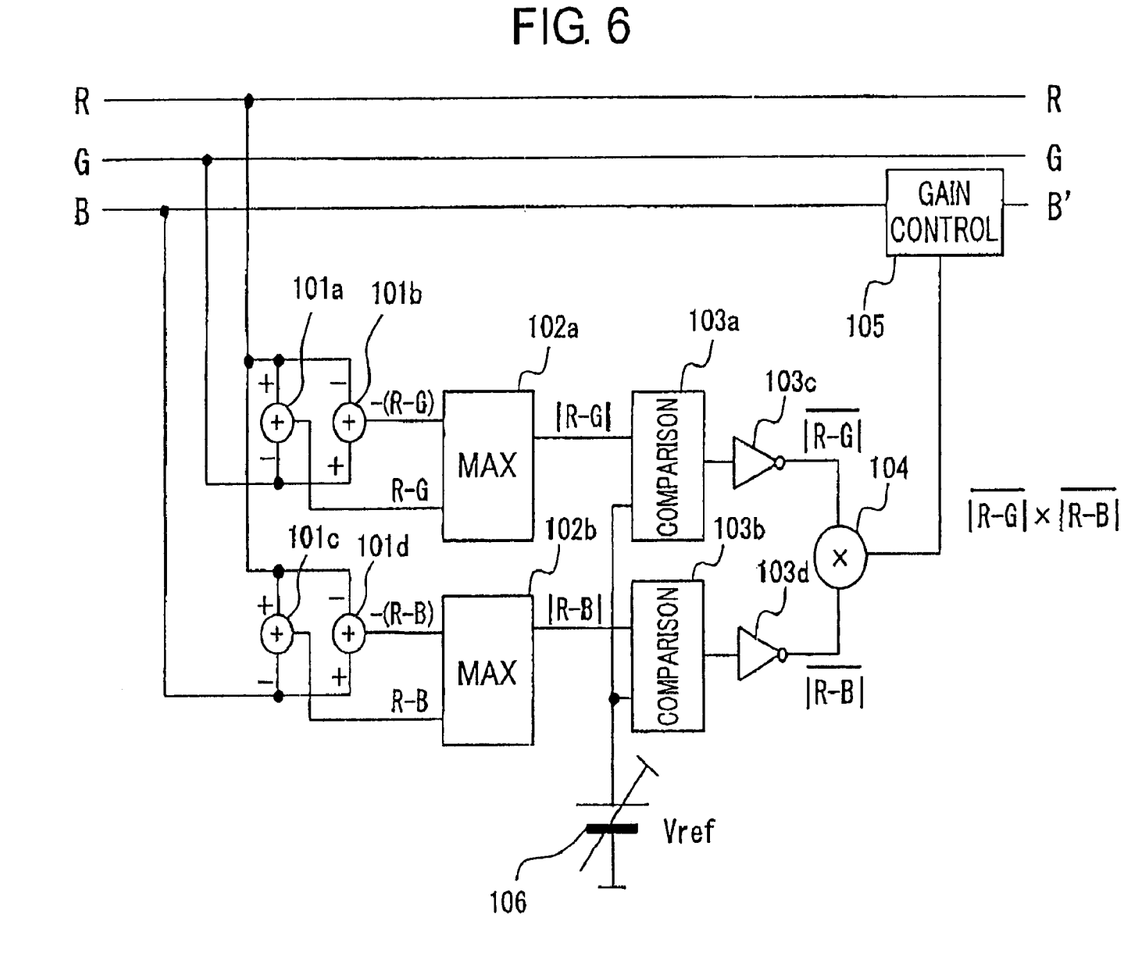
FIG. 6 is a block diagram showing a conventional technique.

Three primary color signals R, G and B are input to subtracters $101a$, $101b$, $101c$ and $101d$. The subtracters $101a$, $101b$, $101c$ and $101d$ output (R−G), −(R−G), (R−B) and −(R−B), respectively. The outputs (R−G) and −(R−G), and (R−B) and −(R−B) are input to maximum value detection circuits $102a$ and $102b$, respectively. Greater one of (R−G) and −(R−G), and greater one of (R−B) and −(R−B) are selected and taken out. As a result, absolute values |R−G| and |R−B| of respective differences are obtained. Subsequently, the absolute values |R−G| and |R−B| of respective differences are compared with a reference level Vref supplied from a reference voltage generation circuit 106 in comparison circuits $103a$ and $103b$, respectively. If the difference absolute value |R−G| or |R−B| is greater than the reference level Vref, then the pertinent comparison circuit outputs zero. If the difference absolute value |R−G| or |R−B| is less than the reference level Vref, then the pertinent comparison circuit produces an output 1

$$\overline{(|R-G|)}$$

or an output 2

$$\overline{(|R-B|)}$$

Figure 7:
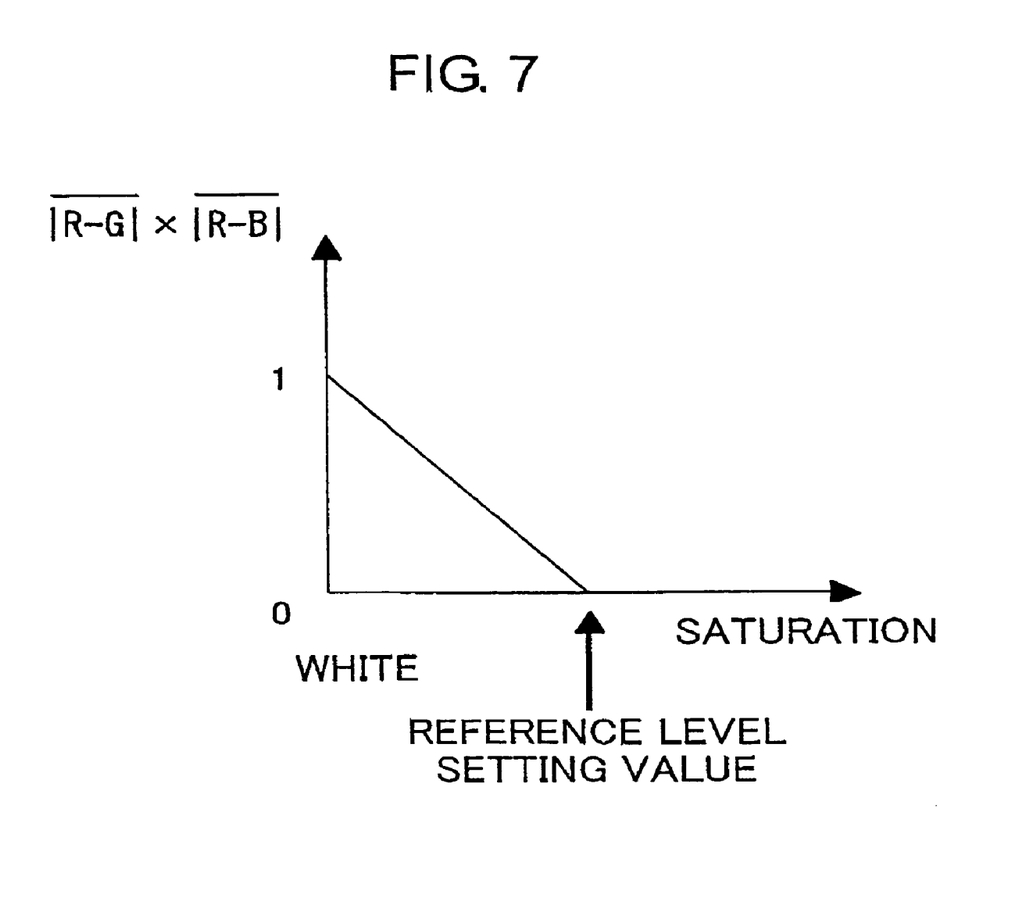
FIG. 7 is a diagram showing color detection characteristic in a conventional technique.

Signal inversion circuits $103c$ and $103d$ are provided in order to obtain a positive output when the pertinent difference absolute value is lower than the reference level. Outputs of the signal inversion circuits $103c$ and $103d$ are multiplied by each other in a multiplier 104 to produce $$\overline{|R-G|} \times \overline{|R-B|}$$

as a color detection output. When R and G, and R and B are respectively at nearly equal levels, i.e. when the saturation is low, therefore, the color detection output is obtained. This indicates white to an achromatic color. A color detection characteristic in this conventional example is shown in FIG. 7. If the saturation becomes lower than a saturation corresponding to the reference level setting, the color detection output is obtained.

A gain control section 105 increases or decreases the gain of the blue color on the basis of the color detection output. As a result, white with strong blueness, i.e., a white color having a high color temperature can be obtained only at the time of an achromatic color.

SUMMARY OF THE INVENTION

In the above-described method, difference between the three primary color signals is obtained in order to judge the color saturation. At this time, luminance information is lost. Even if the original luminance levels are different, therefore, the calculation indicates the same color saturation as long as the difference is the same. For example, two colors (R, G, B)=(200, 100, 100) and (R, G, B)=(120, 20, 20) are subject to the color temperature correction while being regarded as colors having equal color saturations.

Even if the same difference value is obtained, however, originally a color having a higher original luminance level is closer to the white color and lower in color saturation. In other words, in the conventional technique, accurate color saturation cannot be judged. In some cases, the balance in luminance level between colors of the same chromaticity changes between before and after the correction.

An object of the present invention is to provide a color temperature correction technique capable of correcting color temperature so as to make a color temperature of a color close to the white color higher while maintaining the balance in luminance level between colors of the same chromaticity.

In order to achieve the object, the following configurations are adopted in the present invention.

In accordance with a first aspect of the present invention, a color temperature correction circuit to be used in an apparatus for displaying a color image, includes a correction value calculation circuit that calculates a value of $$a*Min-b*Max$$

from three primary color signals RGB (where Max is a maximum value of R, G and B, Min is a minimum value of R, G and B, and a and b are coefficients satisfying the relations a>0, b>0 and a>b), and obtains a correction value on the basis of a result of the calculation; and a correction circuit that corrects the signal B by using the correction value.

In accordance with a second aspect of the present invention, a color temperature correction circuit to be used in an apparatus for displaying a color image, includes a correction value calculation circuit that calculates a value of $$c*Y-d*(Max-Min)$$

from three primary color signals RGB and a luminance signal Y corresponding to the three primary color signals (where Max is a maximum value of R, G and B, Min is a minimum value of R, G and B, and c and d are coefficients satisfying the relations c>0 and d>0), and obtains a correction value on the basis of a result of the calculation; and a correction circuit that corrects the signal B by using the correction value.

In accordance with a third aspect of the present invention, a color temperature correction circuit to be used in an apparatus for displaying a color image, includes a correction value calculation circuit that calculates a value of $$a*Min-b*Max$$

from three primary color signals RGB (where Max is a maximum value of R, G and B, Min is a minimum value of R, G and B, and a and b are coefficients satisfying the relations a>0, b>0 and a>b), and obtains a correction value on the basis of a result of the calculation; and a correction circuit that corrects the signal R or G by using the correction value.

In accordance with a fourth aspect of the present invention, a color temperature correction circuit to be used in an apparatus for displaying a color image, includes a correction value calculation circuit that calculates a value of $$c*Y-d*(Max-Min)$$

from three primary color signals RGB and a luminance signal Y corresponding to the three primary color signals (where Max is a maximum value of R, G and B, Min is a minimum value of R, G and B, and c and d are coefficients satisfying the relations c>0 and d>0), and obtains a correction value on the basis of a result of the calculation; and a correction circuit that corrects the signal R or G by using the correction value.

In accordance with a fifth aspect of the present invention, a color temperature correction circuit to be used in an apparatus for displaying a color image, includes a correction value calculation circuit that calculates a value of $$(Max-Min)/Max$$

from three primary color signals RGB (where Max is a maximum value of R, G and B, and Min is a minimum value of R, G and B), and obtains a correction value on the basis of a result of the calculation; and a correction circuit that corrects the signal B by using the correction value.

In accordance with a sixth aspect of the present invention, a color temperature correction circuit to be used in an apparatus for displaying a color image, includes a correction value calculation circuit that calculates a value of $$(Max-Min)/Max$$

from three primary color signals RGB (where Max is a maximum value of R, G and B, and Min is a minimum value of R, G and B), and obtains a correction value on the basis of a result of the calculation; and a correction circuit that corrects the signal R or G by using the correction value.

DESCRIPTION OF THE PREFERRED EMBODIMENTS (First Embodiment)

Prior to description of a circuit configuration of a first embodiment, first, a principle of correction in the present embodiment will now be described.

A difference Max−Min between a maximum value Max and a minimum value Min of input signals R, G and B becomes closer to 0 as the color becomes closer to an achromatic color (white color). However, this value does not contain a quantity that reflects the original signal levels (luminance levels). Therefore, Min is selected as a quantity that reflects the original signal level. And a quantity S1 obtained by multiplying Min by p (p>0) and acquiring a difference between a resultant product and (Max−Min)

$$S1=p*Min-(Max-Min)=(P+1)*Min-Max \quad \text{(expression 1)}$$

will be considered. If the value of Min is fixed, then S1 becomes greater as Max−Min becomes smaller, whereas S1 becomes smaller as Max−Min becomes greater. Therefore, S1 becomes greater as the color becomes closer to an achromatic color, whereas S1 becomes smaller as the degree of chromatic color becomes greater. In the case where S1 is positive, S1 is multiplied by an appropriate coefficient to calculate a correction value ΔB $$\Delta B=b*((p+1)*Min-Max) \quad \text{(expression 2)}$$

where b is a coefficient determined so as to make the level of the correction value suitable. This is added to B. As the color is closer to an achromatic color, the added quantity becomes great and the blueness becomes strong, resulting in greatly corrected color temperature. As the degree of chromatic color becomes great, the added quantity becomes small and correction of the color temperature becomes small.

The variation of the value of S1 caused when the value of p is changed will now be described.

Figure 5A:
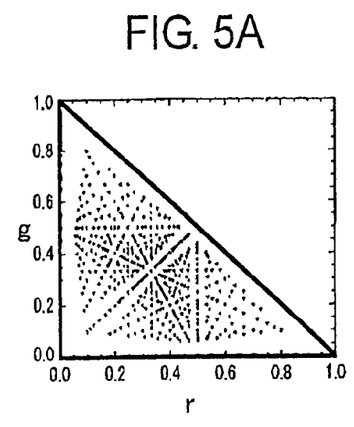
FIG. 5 is a diagram showing a detection range of the white color in embodiments of the present invention.

FIG. 5A is an rg chromaticity diagram with its x axis representing r=R/(R+G+B) and its y axis representing g=G/(R+G+B). Each of R, G and B is changed by nine steps. Respectively for 9×9×9 colors obtained by combining them, rg chromaticity values have been calculated and plotted.

A point with r=0 and g=0 in the rg chromaticity diagram corresponds to a color for which only B has a value and R and G are 0. A point with r=1 and g=0 in the rg chromaticity diagram corresponds to a color for which only R has a value and G and B are 0. A point with r=0 and g=1 in the rg chromaticity diagram corresponds to a color for which only G has a value and R and B are 0. Every color represented by RGB inputs is present in a triangle formed by connecting those three points The white color becomes a point with r=1/3 and g=1/3. A color close to this point is a color close to the white color, i.e., an achromatic color. As a color goes away from the point with r=1/3 and g=1/3, it becomes a chromatic color.

Figure 5B:
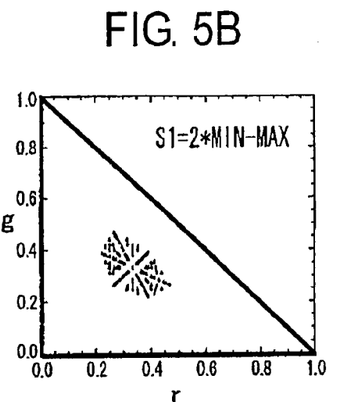
Figure 5C:
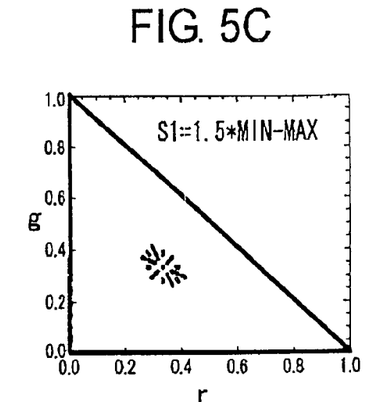

Among colors shown in FIG. 5A, only colors for which an expression obtained by substituting 1 for p in the expression 1, i.e., $$S1=(1+1)*Min-Max=2*Min-Max$$

becomes positive have been plotted as shown in FIG. 5B. In FIG. 5C, only colors for which an expression obtained by substituting 0.5 for p in the expression 1, i.e., $$S1=(0.5+1)*Min-Max=1.5*Min-Max$$

becomes positive have been plotted.

As apparent from FIGS. 5A to 5C, reducing the value of p narrows the range in which colors are detected as achromatic colors.

In addition, as an important property of ΔB, there is a property that colors having the same RGB ratios have the same RGB ratios even after the correction.

It is now supposed that input RGB signals are (R, G, B)=(R1, G1, B1), a maximum value is Max=R1, and a minimum value is Min=B1. At this time, a correction value ΔB1 to be added to B becomes $$\Delta B1 = b*((p+1)*B1-R1).$$

Subsequently, supposing inputs equivalent to k times those inputs as represented by (R, G, B)=(k*R1, k*G1, k*B1), the maximum value becomes Max=k*R1 and the minimum value becomes Min=k*B1. A correction value ΔB2 to be added to B becomes $$\Delta B2 = b*((p+1)*k*B1-k*R1) = k*\Delta B1.$$

Thus, the correction value also becomes k times. Therefore, inputs having the same original RGB ratios become signals having the same RGB ratios even after the correction.

By using the ΔB represented by the expression 2 as the correction value, therefore, color temperature correction having the following features becomes possible.

The correction range is variable, and correction is great as the color is closer to the white color.

Colors having the same original RGB ratios become colors having the same RGB ratios even after the correction.

The expression 2 can be rewritten as $$\Delta B = b*(p+1)*\text{Min} - b*\text{Max}.$$

Letting b*(p+1)=a, the correction value ΔB can be represented as $$\Delta B = a*\text{Min} - b*\text{Max} \quad \text{(expression 3)}$$

Conditions to be satisfied by a and b will now be described. For conducting correction, ΔB must be positive. In other words, $$a*\text{Min} - b*\text{Max} > 0.$$

This can be rewritten as $$\text{Min} > b/a*\text{Max}.$$

Max does not become smaller than Min. For the presence of a set of Min and Max satisfying the expression, the relation b/a<1 must be satisfied. Furthermore, when Max is constant, ΔB is increased as Min is increased. When Min is constant, ΔB is decreased as Max is increased. Therefore, the relations a>0 and b>0 must be satisfied. Accordingly, b/a<1 can be rewritten as a>b.

In summary, conditions on a and b become a>0, b>0 and a>b.

Figure 1:
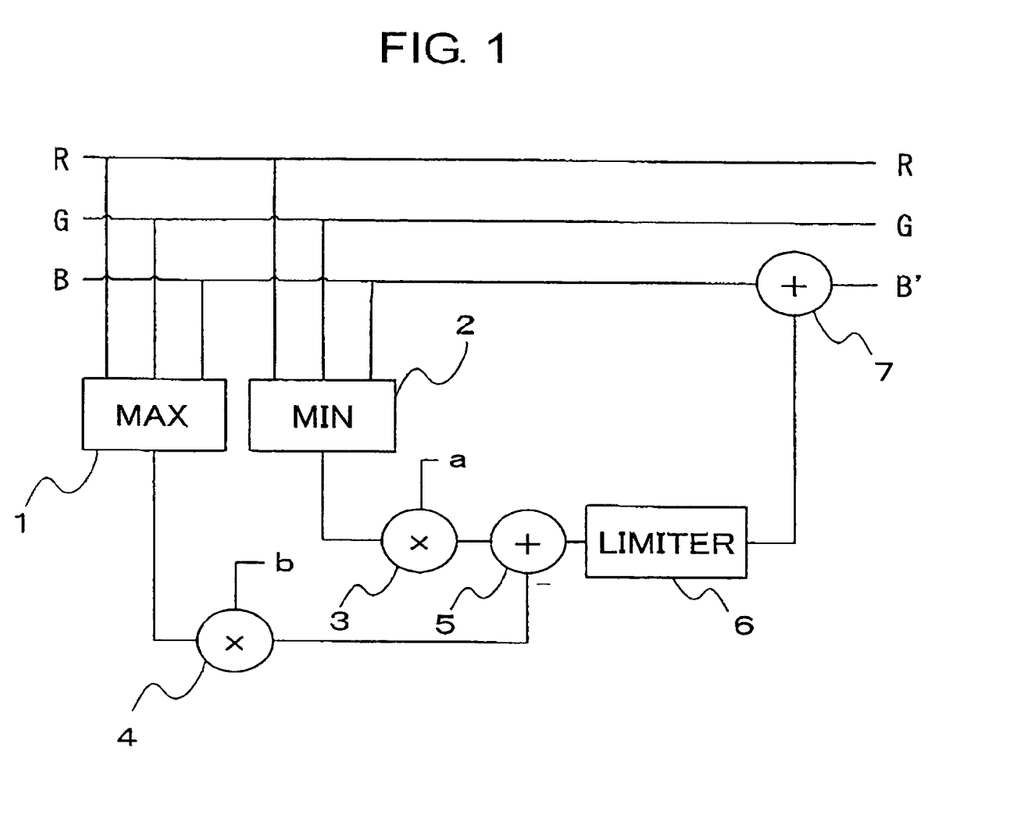
FIG. 1 is a block diagram showing a first embodiment of the present invention.

A circuit configuration of an embodiment of the present invention based on the principle heretofore described will now be described with reference to the drawing. FIG. 1 is a block diagram showing a first embodiment of the present invention. As shown in FIG. 1, a color temperature correction circuit according to the first embodiment includes a maximum value detection circuit 1, a minimum value detection circuit 2, multipliers 3 and 4, a subtracter 5, a limiter 6, and an adder 7.

Primary color signals RGB are input to the maximum value detection circuit 1 and the minimum value detection circuit 2. The maximum value detection circuit 1 outputs a value Max of maximum one of R, G and B. The minimum value detection circuit 2 outputs a value Min of minimum one of R, G and B. An output of the minimum value detection circuit 2 is input to the multiplier 3, multiplied by "a" therein, and output. An output of the maximum value detection circuit 1 is input to the multiplier 4, multiplied by "b" therein, and output. The subtracter 5 subtracts the output of the multiplier 4 from the output of the multiplier 3.

Therefore, the subtracter 5 outputs $$a*\text{Min} - b*\text{Max}.$$

The output of the subtracter 5 is input to the limiter 6. If the output of the subtracter 5 is positive, then the limiter 6 outputs it without change. If the output of the subtracter 5 is negative or 0, then the limiter 6 outputs 0. The output of the limiter 6 is added in the adder 7 to the primary color signal B. In other words, the maximum value detection circuit 1, the minimum value detection circuit 2, the multipliers 3 and 4, the subtracter 5 and the limiter 6 constitute a correction value calculation circuit. And the adder 7 corresponds to a correction circuit.

Therefore, an output B' of the adder 7 becomes $$B' = B + a*\text{Min} - b*\text{Max}$$

(when a*Min−b*Max>0)

$$B' = B$$

(when a*Min−b*Max≦0).

Therefore, since the correction value represented by the expression 3 is added to B, the color temperature is corrected to become higher.

Owing to such a configuration, the color temperature can be corrected so as to become higher as the color is closer to an achromatic color (white color). In addition, the balance in luminance level among the same chromaticity colors can be maintained. In other words, as for inputs having the same color and different levels, the relation that the color is the same and the levels are different is maintained even after the correction.

In the present embodiment, the color temperature is made higher by adding the correction value to the signal B. However, it is also possible to constitute a configuration to correct the color temperature so as to make it higher by subtracting a correction value from the signal R or G.

(Second Embodiment)

In the present embodiment as well, correction is conducted on the basis of a principle similar to that of the first embodiment. In the case of the present embodiment, however, the Y signal is used as a quantity representing the original signal level.

When the input signal is a white color signal, Y is determined so as to satisfy the relation R=G=B=Y. For example, in the case of an NTSC signal, Y is defined by the following expression.

$$Y = 0.3R + 0.59G + 0.11B$$

On the basis of this, $$S2 = q*Y - (\text{Max} - \text{Min}) \quad \text{(expression 4)}$$

is used as a quantity corresponding to S1 in the first embodiment. Here, Max is a maximum value of the inputs R, G and B. Min is a minimum value of them, and q is a coefficient.

In the same way as S1, S2 also becomes great and approaches the value of q*Y as Max−Min becomes small, i.e., the color becomes closer to the white color. As Max−

Min becomes great, i.e., the degree of chromatic color becomes great, S2 becomes small, and S2 becomes negative in some cases.

In the case where S2 becomes positive, S2 is multiplied by an appropriate coefficient and a resultant product is added to B. The closer to the white color the color is, therefore, the greater the correction on the signal B becomes and the color temperature is corrected to become higher.

Variation of S2 caused when the value of q is changed will now be described.

When 1 is substituted for q in the expression 4, S2 becomes $$S2=Y-(\text{Max}-\text{Min}).$$

Figure 5D:
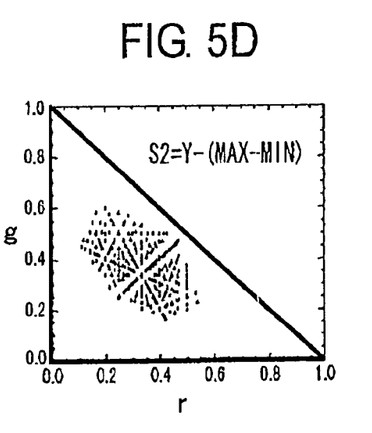

Among colors shown in FIG. 5A, only colors for which S2 becomes positive have been plotted as shown in FIG. 5D.

Figure 5E:
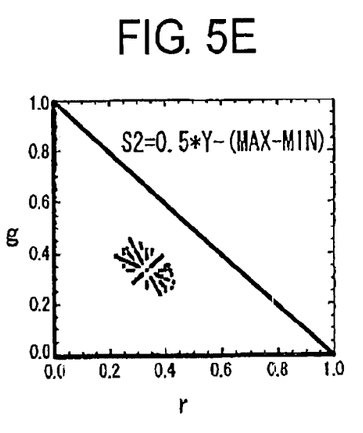

In FIG. 5E, points for which an expression obtained by substituting 0.5 for q in the expression 4, i.e., $$S2=0.5*Y-(\text{Max}-\text{Min})$$

becomes positive have been plotted. As apparent from FIG. 5E, reducing the value of q narrows the range in which colors are detected as the white color.

In order to correct the color temperature, therefore, S2 is multiplied by an appropriate coefficient d to produce a correction value $\Delta B_Y$. The $\Delta B_Y$ is added to B.

$$\Delta B_Y = d*(q*Y-(\text{Max}-\text{Min})) = d*q*Y - d*(\text{Max}-\text{Min})$$

Letting $d*q=c$, this expression can be represented as $$\Delta B_Y = c*Y - d*(\text{Max}-\text{Min}) \quad \text{(expression 5)}$$

Conditions to be satisfied by c and d in the expression 5 will now be described. When Max=Min, $\Delta B_Y$ has a positive value. Therefore, it follows that $c>0$. In addition, $\Delta B_Y$ is decreased as (Max−Min) is increased, and $\Delta B_Y$ is increased as (Max−Min) is decreased. Therefore, it follows that $d>0$.

It will now be described that colors having the same RGB ratios have the same RGB ratios even after the correction in the present embodiment as well in the same way as the first embodiment.

It is now supposed that input RGB signals are (R, G, B)=(R1, G1, B1), a maximum value is Max=R1, and a minimum value is Min=B1. At this time, a correction value $\Delta B3$ to be added to B becomes $$\Delta B3 = c*Y - d*(R1-B1).$$

Subsequently, supposing inputs equivalent to k times those inputs as represented by (R, G, B)=(k*R1, k*G1, k*B1), it follows that Max=k*R1, Min=k*B1, and Y=k*Y. A correction value $\Delta B4$ to be added to B becomes $$\Delta B4 = c*k*Y - d*(k*R1 - k*B1) = k*(c*Y - d*(R1-B1))$$
$$= k*\Delta B3.$$

Thus, the correction value also becomes k times. Therefore, inputs having the same original RGB ratios become signals having the same RGB ratios even after the correction.

Figure 2:
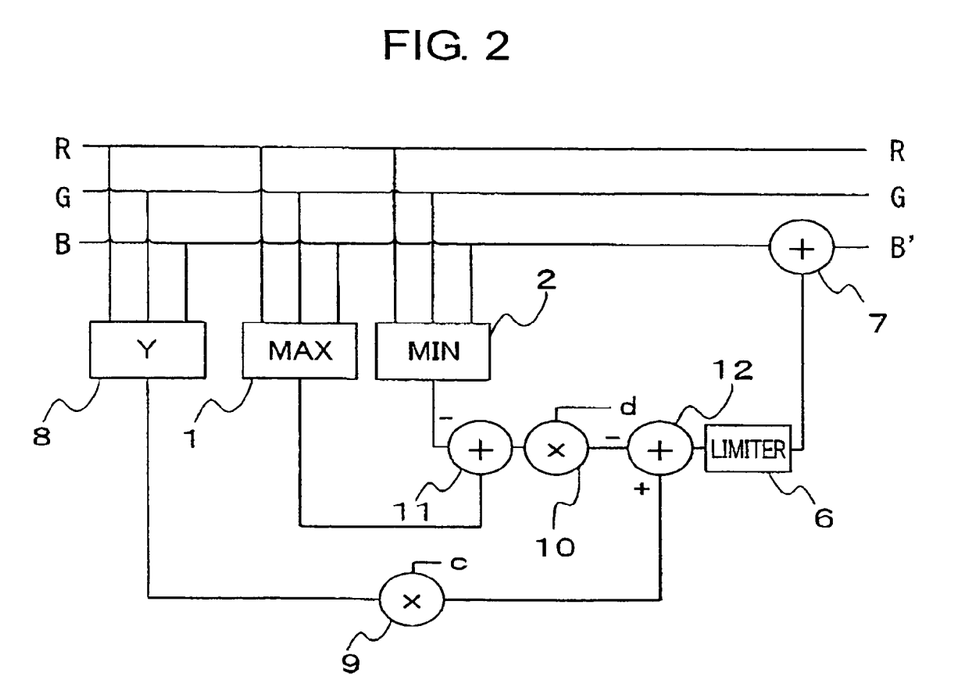
FIG. 2 is a block diagram showing a second embodiment of the present invention.

FIG. 2 is a configuration diagram showing a second embodiment of a color temperature correction circuit according to the present invention based on the principle heretofore described. The color temperature correction circuit according to the present embodiment includes a luminance calculation circuit 8, a maximum value detection circuit 1, a minimum value detection circuit 2, multipliers 9 and 10, subtracters 11 and 12, a limiter 6, and an adder 7.

Components corresponding to those shown in FIG. 1 are denoted by like characters, and consequently duplicated description will be omitted.

Input RGB signals are input to the maximum value detection circuit 1 and the minimum value detection circuit 2 in the same way as the first embodiment. The maximum value detection circuit 1 outputs a maximum value Max and the minimum value detection circuit 2 outputs a minimum value Min. In the present embodiment, the RGB signals are further input to the luminance calculation circuit 8, and the luminance level Y is calculated.

The subtracter 11 calculates a difference (Max−Min) between the maximum value Max and the minimum value Min. The multiplier 10 multiplies the difference by the coefficient d. Furthermore, the multiplier 9 multiplies Y by the coefficient c. In addition, the subtracter 12 subtracts an output of the multiplier 10 from an output of the multiplier 9.

In other words, the subtracter 12 outputs $$c*Y - d*(\text{Max}-\text{Min}).$$

Only when the output of the subtracter 12 is positive, then the limiter 6 outputs it without change. If the output of the subtracter 12 is negative or 0, then the limiter 6 outputs 0. The output of the limiter 6 is added in the adder 7 to the signal B. In other words, the maximum value detection circuit 1, the minimum value detection circuit 2, the luminance calculation circuit 8, the multipliers 9 and 10, the subtracters 11 and 12, and the limiter 6 constitute a correction value calculation circuit. And the adder 7 corresponds to a correction circuit.

Therefore, an output B' of the adder 7 becomes $$B' = B + c*Y - d*(\text{Max}-\text{Min})$$

(when $c*Y - d*(\text{Max}-\text{Min}) > 0$)

$$B' = B$$

(when $c*Y - d(\text{Max}-\text{Min}) \leq 0$)

Thus, the correction value represented by the expression 5 is added to B.

Owing to such a configuration, the color temperature can be corrected so as to become higher as the color is closer to an achromatic color (white color). In addition, the balance in luminance level among the same chromaticity colors can be maintained. In other words, as for inputs having the same color and different levels, the relation that the color is the same and the levels are different is maintained even after the correction.

In the present embodiment, the circuit for obtaining Y from the RGB signals is used. In the case where RGB is obtained by converting a Y color difference signal, however, the Y signal in the Y color difference signal before conversion to RGB may be used intactly as Y. In that case, the circuit configuration becomes simple.

In the present embodiment as well, the color temperature is made higher by adding the correction value to the signal B. However, it is also possible to constitute a configuration to correct the color temperature so as to make it higher by subtracting a correction value from the signal R or G.

(Third Embodiment)

Figure 3:
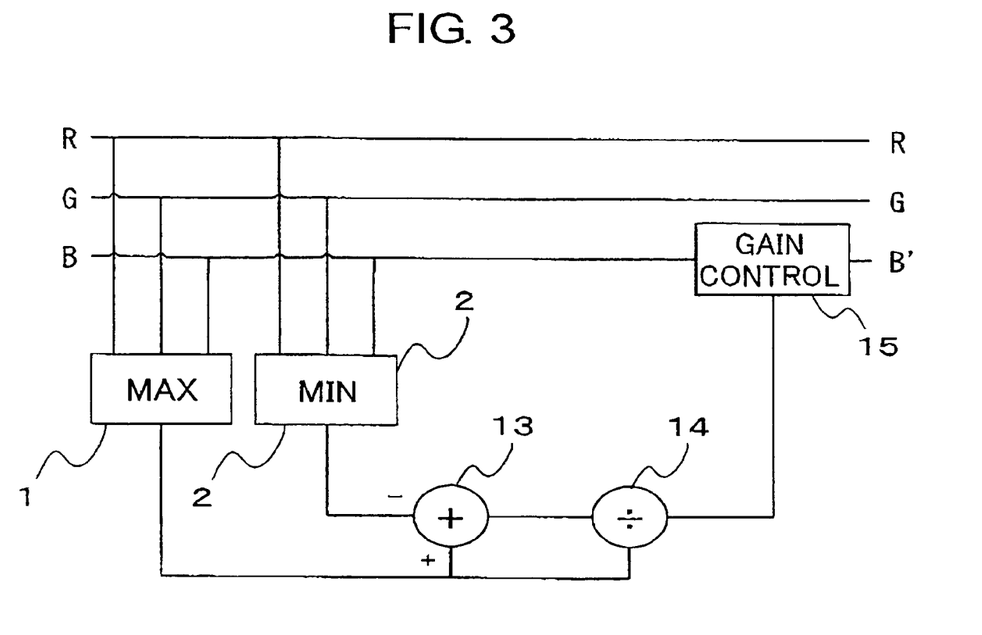
FIG. 3 is a block diagram showing a third embodiment of the present invention.

FIG. 3 is a configuration diagram showing a third embodiment of a color temperature correction circuit according to the present invention. The color temperature correction circuit according to the present embodiment includes a maximum value detection circuit 1, a minimum value detection circuit 2, a subtracter 13, a divider 14, and a gain control circuit 15. Components corresponding to those shown in FIG. 1 are denoted by like characters, and consequently duplicated description will be omitted.

An output S3 of the divider 14 becomes $$S3 = (Max - Min)/Max.$$

This value is decreased as (Max−Min) is decreased. When Max=Min, S3 assumes a minimum value 0. As (Max−Min) is increased, S3 is increased. When Min=0, S3 assumes a maximum value 1. Therefore, S3 can be regarded as a quantity that represents the saturation. The gain control circuit corrects the value of B by multiplying the signal B by a coefficient based on an input value of S3. In other words, the maximum value detection circuit 1, the minimum value detection circuit 2, the subtracter 13 and the divider 14 constitute a correction value calculation circuit. The gain control circuit 15 corresponds to a correction circuit.

Figure 4:
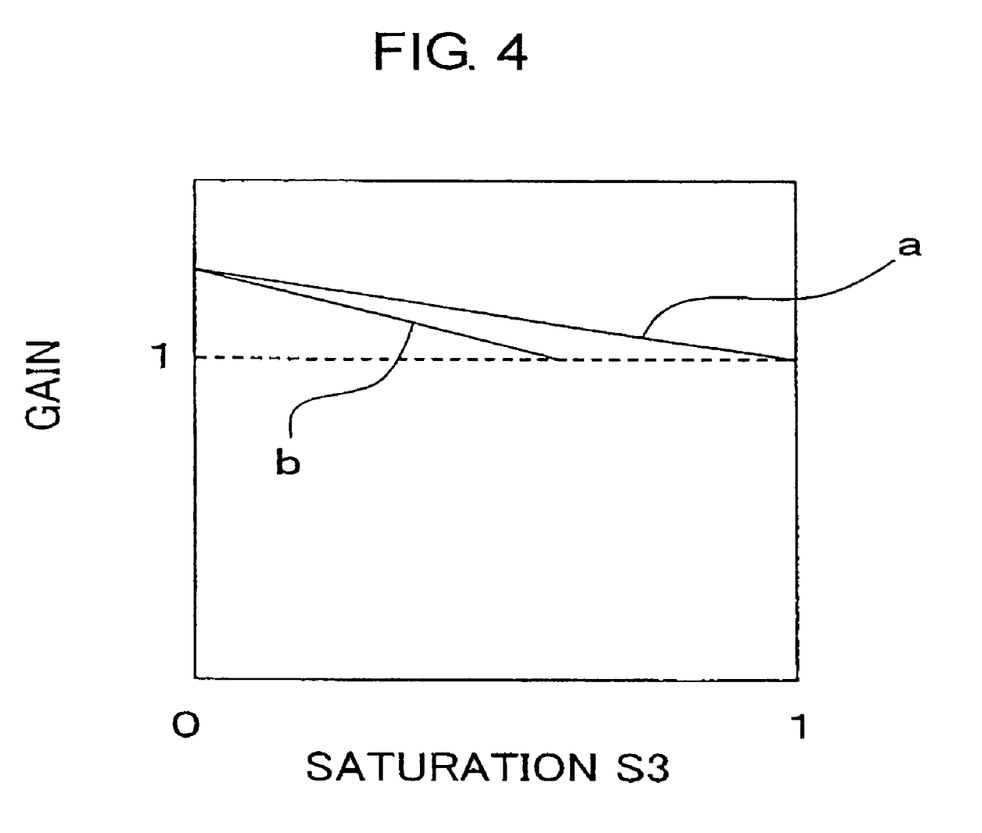
FIG. 4 is a characteristic diagram of gain control in a third embodiment of the present invention.

FIG. 4 shows a characteristic example of the gain control circuit. Two characteristics a and b are illustrated. In both characteristics, the correction quantity on the signal B becomes greater as S3 is decreased, i.e., as the color becomes closer to the white color, whereas the correction quantity is decreased as the color becomes closer to a chromatic color. In the case of the characteristic b, the gain becomes 1 and the color temperature correction is not conducted, when S3 is equal to or greater than a certain value.

It will now be described that colors having the same RGB ratios and different levels have the same RGB ratios even after the correction in the present embodiment as well.

It is now supposed that input three primary color signals RGB are (R, G, B)=(R1, G1, B1), Max=R1, and Min=B1. At this time, the output S3 of the divider 12 becomes $$S3 = (R1 - B1)/R1.$$

Subsequently, supposing inputs equivalent to k times those inputs as represented by (R, G, B)=(k*R1, k*G1, k*B1), it follows that Max=k*R1 and Min=k*B1. Therefore, the output S3 of the divider 12 becomes $$S3 = (k*R1 - k*B1)/k*R1 = S3.$$

The same value is thus obtained. Therefore, B1 and k*B1 are multiplied by the same coefficient in the gain control circuit 15. Even after the correction, the RGB ratios of the two colors are kept the same.

Owing to such a configuration, the color temperature can be corrected so as to become higher as the color is closer to an achromatic color (white color). In addition, the balance in luminance level among the same chromaticity colors can be maintained. In other words, as for inputs having the same color and different levels, the relation that the color is the same and the levels are different is maintained even after the correction.

In the present embodiment, the color temperature is made higher by multiplying the signal B by the correction value. However, it is also possible to constitute a configuration to correct the color temperature so as to make it higher by dividing a signal R or G by a correction value.

What is claimed is:

1. A color temperature correction circuit to be used in an apparatus for displaying a color image, comprising:
   a correction value calculation circuit that calculates a value of $$a*Min - b*Max$$

from three primary color signals RGB (where Max is a maximum value of R, G and B, Min is a minimum value of R, G and B, and a and b are coefficients satisfying the relations a>0, b>0 and a>b), and obtains a correction value on the basis of a result of the calculation; and a correction circuit that corrects the signal B by using the correction value.

2. A color temperature correction circuit to be used in an apparatus for displaying a color image, comprising:
   a correction value calculation circuit that calculates a value of $$c*Y - d*(Max - Min)$$

from three primary color signals RGB and a luminance signal Y corresponding to the three primary color signals (where Max is a maximum value of R, G and B, Min is a minimum value of R, G and B, and c and d are coefficients satisfying the relations c>0 and d>0), and obtains a correction value on the basis of a result of the calculation; and a correction circuit that corrects the signal B by using the correction value.

3. A color temperature correction circuit according to claim 1, wherein the correction circuit adds the correction value to the signal B.

4. A color temperature correction circuit according to claim 2, wherein the correction circuit adds the correction value to the signal B.

5. A color temperature correction circuit to be used in an apparatus for displaying a color image, comprising:
   a correction value calculation circuit that calculates a value of $$a*Min - b*Max$$

from three primary color signals RGB (where Max is a maximum value of R, G and B, Min is a minimum value of R, G and B, and a and b are coefficients satisfying the relations a>0, b>0 and a>b), and obtains a correction value on the basis of a result of the calculation; and a correction circuit that corrects the signal R or G by using the correction value.

6. A color temperature correction circuit to be used in an apparatus for displaying a color image, comprising:
   a correction value calculation circuit that calculates a value of $$c*Y - d*(Max - Min)$$

from three primary color signals RGB and a luminance signal Y corresponding to the three primary color signals (where Max is a maximum value of R, G and B, Min is a minimum value of R, G and B, and c and d are coefficients satisfying the relations c>0 and d>0), and obtains a correction value on the basis of a result of the calculation; and a correction circuit that corrects the signal R or G by using the correction value.

7. A color temperature correction circuit according to claim 5, wherein the correction circuit subtracts the correction value from the signal R or G.

8. A color temperature correction circuit according to claim 6, wherein the correction circuit subtracts the correction value from the signal R or G.

9. A color temperature correction circuit to be used in an apparatus for displaying a color image, comprising:
a correction value calculation circuit that calculates a value of (Max−Min)/Max from three primary color signals RGB (where Max is a maximum value of R, G and B, and Min is a minimum value of R, G and B), and obtains a correction value on the basis of a result of the calculation; and
a correction circuit that corrects the signal B by using the correction value.

10. A color temperature correction circuit according to claim 9, wherein the correction circuit multiplies the signal B by the correction value.

11. A color temperature correction circuit to be used in an apparatus for displaying a color image, comprising:
a correction value calculation circuit that calculates a value of (Max−Min)/Max from three primary color signals RGB (where Max is a maximum value of R, G and B, and Min is a minimum value of R, G and B), and obtains a correction value on the basis of a result of the calculation; and
a correction circuit that corrects the signal R or G by using the correction value.

12. A color temperature correction circuit according to claim 11, wherein the correction circuit divides the signal R or G by the correction value.

* * * * *

UNITED STATES PATENT AND TRADEMARK OFFICE
CERTIFICATE OF CORRECTION

PATENT NO.       : 7,190,410 B2
APPLICATION NO.  : 10/887829
DATED            : March 13, 2007
INVENTOR(S)      : Kohei Inamura Page 1 of 1

It is certified that error appears in the above-identified patent and that said Letters Patent is hereby corrected as shown below:

ON THE TITLE PAGE:
At Item (57), Abstract, Line 10, "Man" should read --Max--.

Signed and Sealed this

Twentieth Day of November, 2007

JON W. DUDAS
*Director of the United States Patent and Trademark Office*